United States Patent [19]
Shimada et al.

[11] 4,439,810
[45] Mar. 27, 1984

[54] ELECTRIC CAPACITOR WITH ENCLOSURE STRUCTURE CONSISTING OF PLASTIC LAMINATED FILM

[75] Inventors: Hiroshi Shimada; Kiyoshi Sakamoto, both of Nagai, Japan

[73] Assignee: Marcon Electronics Co., Ltd., Nagai, Japan

[21] Appl. No.: 408,875

[22] Filed: Aug. 17, 1982

[30] Foreign Application Priority Data

Sep. 10, 1981 [JP] Japan .............................. 56-135333[U]
Sep. 10, 1981 [JP] Japan .............................. 56-135334[U]

[51] Int. Cl.³ ........................ H01G 1/06; B65D 73/02
[52] U.S. Cl. .................................... 361/272; 206/328
[58] Field of Search ................ 361/272, 433; 206/328, 206/329, 331, 332, 333

[56] References Cited
U.S. PATENT DOCUMENTS

| 4,154,344 | 5/1979 | Yenni et al. ...................... 206/328 X |
| 4,266,332 | 5/1981 | Markarian et al. ............. 361/433 X |
| 4,267,565 | 5/1981 | Puppolo et al. ..................... 361/433 |
| 4,267,566 | 5/1981 | Moresi, Jr. ......................... 361/433 |

FOREIGN PATENT DOCUMENTS

| 53-13146 | 11/1978 | Japan . |
| 54-79460 | 6/1979 | Japan . |
| 54-148264 | 11/1979 | Japan ................................... 361/272 |
| 55-26608 | 2/1980 | Japan . |
| 55-62722 | 5/1980 | Japan ................................... 361/272 |

Primary Examiner—Donald A. Griffin
Attorney, Agent, or Firm—Oblon, Fisher, Spivak, McClelland & Maier

[57] ABSTRACT

A capacitor element is enclosed within a laminated film including at least a plastic film. The laminated film portion surrounding the capacitor element is heat sealed to form an enclosure structure sealing the capacitor element. The sealing width of the sealed portion formed by heat sealing is selected to be within the range of 1 to 20 mm. The thickness of the inner film of the laminated film opposing the capacitor element is selected to be within the range of 70 to 200 μm. A capacitor of improved life time is obtained.

5 Claims, 8 Drawing Figures

ELECTRIC CAPACITOR WITH ENCLOSURE STRUCTURE CONSISTING OF PLASTIC LAMINATED FILM

BACKGROUND OF THE INVENTION

The present invention relates to an electric capacitor with an enclosure structure consisting of a laminated film and, more particularly, to an electric capacitor with an enclosure structure which is obtained by coating a capacitor element with a thermoplastic laminated film and sealing the outer surface of the obtained structure by heat sealing.

Various types of capacitors such as aluminum electrolytic capacitors, tantalum electrolytic capacitors, plastic film capacitors, paper capacitors, and ceramic capacitors are obtained by enclosing capacitor elements in capacitor enclosures made of a metal such as aluminum, brass, tantalum, silver or nickel, or a synthetic resin such as phenol resin, polypropylene resin, polyethylene resin polyphenylene sulfide resin, or polysulfone resin; or by coating by molding such capacitor elements with a synthetic resin such as epoxy resin or polyester resin. However, with the former type of capacitor which is obtained by enclosing a capacitor element in an enclosure of a metal or a synthetic resin, a relatively great gap is formed between the capacitor enclosure and the capacitor element, so that the overall shape of the capacitor enclosure becomes bulky. Furthermore, the procedure for enclosing the capacitor element in the capacitor enclosure is complex and is time-consuming. On the other hand, with the latter type of capacitor which is obtained by coating the capacitor element with a synthetic resin, control of the thickness of the coating of the synthetic resin is difficult, resulting in non-uniform thickness. Moreover, fine undulations are formed on the surface of the coating, resulting in poor outer appearance of the capacitor.

A capacitor with another enclosure structure is also known in which the structure is obtained by preparing two thermosetting resin sheets each having a recess to accommodate a capacitor element, placing the capacitor element in a cavity formed by opposing the recesses of the two thermosetting resin sheets, adhering the thermosetting resin sheets, and finally pressing under heating to form the structure. However, this type of capacitor is subjected to pressing under heating for a predetermined interval during formation of the enclosure structure from the thermosetting resin sheets. Accordingly, the capacitor element is subjected to thermal stress, and evaporation and/or deterioration of an electrolyte or impregnating agent, and degradation of the capacitor characteristics may be caused.

A capacitor with still another enclosure structure is known in which the enclosure structure is obtained by wrapping a capacitor element by a laminated film of two plastic films with or without a metal foil layer interposed therebetween, and forming a sealed portion of 0.5 to 0.7 mm width at the periphery of the laminated film by heat sealing.

However, it has been found that the width of the sealed portion of the laminated film largely influences the performance of the capacitor with the enclosure structure of this type. More specifically, since the width of the sealed portion is 0.5 to 0.7 mm in the capacitor of this type, operation of the capacitor at a high temperature of, for example, 85° C. for 1,000 hours or longer results in an increase in the internal pressure within the capacitor enclosure. At some point, the sealed portion becomes unable to withstand the internal pressure, causing leakage of the electrolyte and/or impregnating agent of the capacitor therethrough, or causing separation of the sealed portion and failing to sustain the hermetic seal. This may adversely affect the electrostatic capacitance or the dissipation factor tan δ to shorten the life time of the capacitor. However, it has been found that the hermetic seal of the enclosure of the capacitor is significantly improved and the life time of the capacitor is similarly improved if the width of the sealed portion is 1 mm or more.

It has also been found that the thickness of the inner film of the laminated film opposing the capacitor element has a great influence on the characteristics of the capacitor having the enclosure structure of the type as described above. In the conventional capacitors of this type, the thickness of the inner film is, for example, 5 to 50 μm and 350 to 500 μm. With the capacitors of the type wherein the thickness of the inner film is 5 to 50 μm, operation at a high temperature for a long period of time tends to cause separation of the sealed portion or leakage of the electrolyte and/or impregnating agent. Particularly, if the laminated film of the plastic films with the metal foil layer interposed therebetween is used, short-circuiting tends to be caused between the external connecting terminals. On the other hand, with the capacitors of the type wherein the thickness of the inner film is 350 to 500 μm, the electrolyte may evaporate through the section of the inner film or the cleaning agent may be introduced therethrough to shorten the life time of the capacitor. However, it has been found that if the thickness of the inner film is kept within the range of 70 to 200 μm, these problems of separation of the sealed portion, leakage of the electrolyte and/or impregnating agent, short-circuiting between the external connecting terminals, and evaporation of the electrolyte or introduction of the cleaning agent through the section of the inner film may be effectively prevented, whereby the life time of the capacitor is significantly improved.

It has also been found that, in the capacitor having the capacitor enclosure structure consisting of a laminated film, the type of material of the laminated film largely influences the characteristics of the capacitor. Polyethylene or a copolymer mainly consisting of polyethylene is known as the material of the laminated film used for the conventional capacitor of this type. Although these materials are excellent in adhesion strength, flex resistance and oil resistance, they have poor resistance to solvents such as alcohols or ketones. However, if the laminated film consists of at least two different films each consisting of polyethylene terephthalate, polypropylene, polycarbonate, polysulfone, ionomer, polyvinylidene fluoride, polyethylene fluoride, polyvinylidene chloride, or polybutylene terephthalate, a capacitor is obtained which has an excellent resistance to solvents.

SUMMARY OF THE INVENTION

The present invention has been made in consideration of the above and has for its object to provide a capacitor wherein the hermetic seal of a sealed portion of an enclosure structure consisting of a laminated film is prolonged to improve life time characteristics.

It is another object of the present invention to provide a capacitor wherein evaporation of an electrolyte or introduction of a cleaning agent through a section of an enclosure structure consisting of a laminated film is prevented to improve life time characteristics.

It is still another object of the present invention to provide a capacitor with an inexpensive enclosure structure which is excellent in resistance to solvents, which is small in weight and compact in size, and which allows easy mass production.

According to an aspect of the present invention, there is provided an electric capacitor comprising:

a capacitor element having a plurality of external connecting terminals; and a laminated film which includes at least a plastic film and which covers said capacitor element to form a sealed portion around said capacitor element, said sealed portion being sealed to form an enclosure structure for sealing said capacitor element;

wherein a sealing width of said sealed portion is 1 to 20 mm.

According to still another aspect of the present invention, there is also provided an electric capacitor comprising:

a capacitor element having a plurality of external connecting terminals; and a laminated film which includes at least a plastic film and which covers said capacitor element to form a sealed portion around said capacitor element, said sealed portion being sealed to form an enclosure structure for sealing said capacitor element;

wherein a sealing width of said sealed portion is 1 to 20 mm, and a thickness of an inner film of said laminated film opposing said capacitor element is 70 to 200 $\mu$m.

In the electric capacitor of the present invention, the laminated film comprises at least two different films selected from the group consisting of films of polyethylene terephthalate, polypropylene, polycarbonate, polysulfone, ionomer, polyvinylidene fluoride, polyethylene fluoride, polyvinylidene chloride, and polybutylene terephthalate.

DETAILED DESCRIPTION OF THE PREFERRED EMBODIMENTS

The preferred embodiments of the present invention will now be described with reference to the accompanying drawings.

Figure 1:
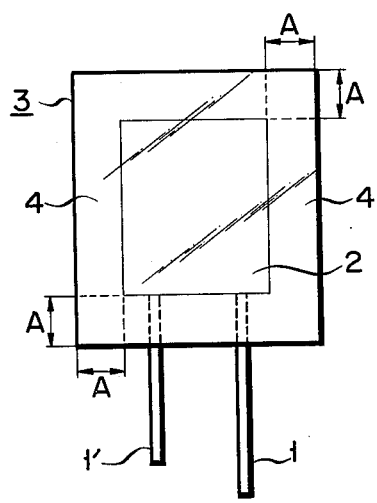
FIG. 1 is a plan view of an aluminum electrolytic capacitor to which an electric capacitor according to an embodiment of the present invention is applied.
Figure 2:
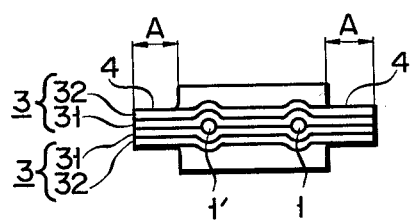
FIG. 2 is a front view of the electrolytic capacitor shown in FIG. 1.
Figure 3:
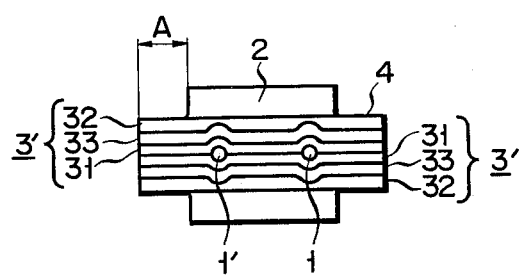
FIG. 3 is a front view of an electrolytic capacitor according to another embodiment of the present invention.

As shown in FIGS. 1 to 3, laminated films 3 or 3' are arranged on the upper and lower surfaces of a flat or columnar capacitor element 2 to which external connecting terminals 1 and 1' are mounted. Each laminated film 3 or 3' comprises either at least two plastic films 31 and 32 each having different resistances to heat and solvents, or a plastic-metal laminated film having these plastic films with a metal foil layer 33 interposed therebetween. The plastic films are at least two different types of plastic films 31 and 32 selected from the group consisting of films of polyethylene terephthalate, polypropylene, polycarbonate, polysulfone, ionomer, polyvinylidene fluoride, polyethylene fluoride, polyvinylidene chloride, and polybutylene terephthalate. The metal foil layer 33 is of a metal such as aluminum, tin or lead. The laminated films 3 or 3' are opposed to each other and the capacitor element 2 is interposed therebetween. The obtained element is heat sealed by a heat sealer such as hot presses or an indentor to form a sealed portion 4 around the capacitor element 2, thus forming a capacitor enclosure. Heat sealing may be performed for a single capacitor element 2 or for a plurality of capacitor elements 2 simultaneously. In place of the hot presses or the indentor as the heat sealer, there may be used an impulse welder, an ultrasonic welder, a high-frequency welder or the like. The sealed portion 4 must have a sealing width A which corresponds to the size of the capacitor element 2 so as to withstand a rise in the internal pressure due to heating or voltage application during operation of the capacitor. The sealing width A must be at least 1 mm as will be described in detail later irrespective of whether one capacitor element is heat sealed or a plurality of capacitor elements are simultaneously heat sealed. Table 1 below shows results of changes in the outer appearance of the capacitor obtained in a life time test wherein a rated voltage was applied to the capacitor in an atmosphere at a temperature of 85° C. and a humidity of 90% RH. Ten aluminum electrolytic capacitors of 50 WV.DC-10 $\mu$F were used as samples for each column of the table. The laminated film of each sample was a plastic-metal laminated film which consisted of a polyethylene terephthalate film of 12 $\mu$m thickness, an aluminum foil layer of 20 $\mu$m thickness, of 100 $\mu$m thickness. Two laminated and an ionomer film of 100 $\mu$m thickness. Two laminated films were heat sealed with the capacitor element interposed therebetween.

TABLE 1

| Sealing width A (mm) | Time (h) 100 | 500 | 1000 | 2000 | 3000 |
|---|---|---|---|---|---|
| 0.5 | None Caused Any Problem | 3 Caused Leakage | Remainder Caused Separation | — | — |
| 0.7 | None Caused Any Problem | None Caused Any Problem | 4 Caused Leakage 6 Caused Separation | — | — |
| 1.0 | None Caused Any Problem | None Caused Any Problem | None Caused Any Problem | 1 Caused Leakage | 2 Caused Leakage 1 Caused Separation |
| 5.0 | None Caused Any Problem | None Caused Any Problem | None Caused Any Problem | None Caused Any Problem | None Caused Any Problem |
| 10.0 | None Caused Any Problem | None Caused Any Problem | None Caused Any Problem | None Caused Any Problem | None Caused Any Problem |
| 15.0 | None Caused Any Problem | None Caused Any Problem | None Caused Any Problem | None Caused Any Problem | None Caused Any Problem |
| 20.0 | None Caused Any Problem | None Caused Any Problem | None Caused Any Problem | None Caused Any Problem | None Caused Any Problem |
| 25.0 | None Caused Any Problem | None Caused Any Problem | None Caused Any Problem | None Caused Any Problem | None Caused Any Problem |

It is seen from Table 1 above that the sealing width A must be at least 1 mm in order to obtain the life time longer than 1,000 hours in a high-temperature and high-humidity atmosphere.

Figure 4:
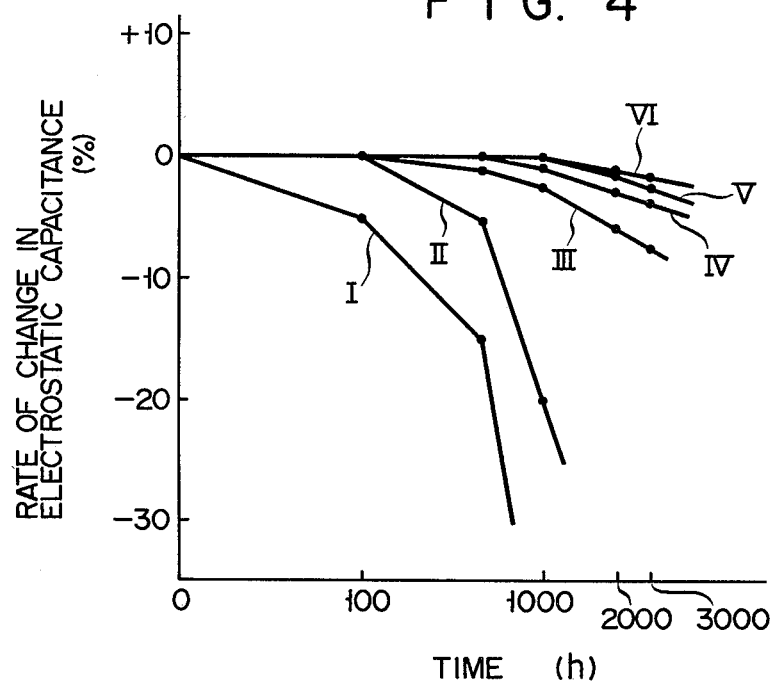
FIG. 4 is a graph showing the life time characteristics (the rate of change in the electrostatic capacitance as a function of time) of the electrolytic capacitor according to the embodiment of the present invention and of the conventional electrolytic capacitor.
Figure 5:
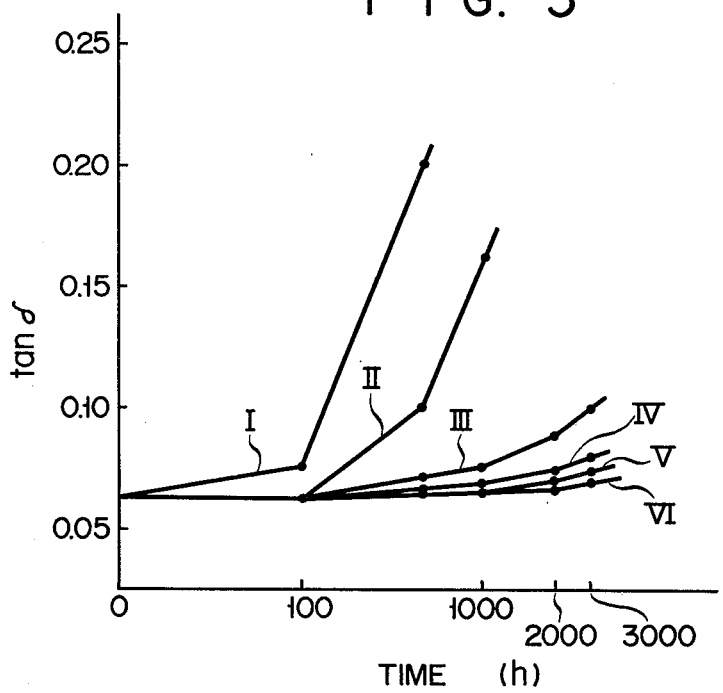
FIG. 5 is a graph showing the life time characteristics (the rate of change in the dissipation factor tan $\delta$ as a function of time) of the electrolytic capacitor according to the embodiment of the present invention and of the conventional electrolytic capacitor.

FIGS. 4 and 5 respectively show the test results on the life time characteristics (rates of change in the electrostatic capacitance and the dissipation factor tan $\delta$ as a function of time; rated voltage was applied in an atmosphere at a temperature of 85° C. and a humidity of 90% RH) of the capacitors. Referring to FIGS. 4 and 5, characteristic curve I corresponds to a sealing width A=0.5 mm; characteristic curve II, A=0.7 mm; characteristic curve III, A=1 mm; characteristic curve IV, A=5 mm; characteristic curve V, A=10 mm; and characteristic curve VI, A=20, 25 and 30 mm. It is seen from FIGS. 4 and 5 that, if the sealing width A is less than 1 mm, leakage or separation occurs within 500 to 1,000 hours, and the electrostatic capacitance and the dissipation factor tan $\delta$ significantly change due to poor hermetic seal. It is furthermore seen from FIGS. 4 and 5 that notable improvements in the characteristics and hermetic seal cannot be obtained even if the sealing width A exceeds 20 mm. Therefore, the sealing length A must be 20 mm or less from the viewpoints of compactness of the capacitor and economy.

Another embodiment of the present invention will now be described with reference to FIG. 3. In the embodiment shown in FIG. 3, the thickness of the plastic film opposing the capacitor element 2 of a laminated film 3', that is, an inner film 31 is set to be 70 to 200 $\mu$m. From the viewpoint of the resistance to solvents, the inner film 31 is a plastic film selected from the group consisting of films of polypropylene, polyvinylidene fluoride, ionomer, and polyethylene fluoride which have good resistance to solvents. The enclosure structure of the capacitor of this embodiment is prepared in a similar manner to that described with reference to the former embodiment. Table 2 shows the test results on the initial defect occurrence in relation to various thicknesses of the inner film of the aluminum electrolytic capacitors of 50 WV.DC-22 $\mu$F. The laminated film of the sample was a plastic-metal laminated film which consisted of a polyethylene terephthalate film of 12 $\mu$m thickness, an aluminum foil layer of 20 $\mu$m thickness, and an ionomer film whose thickness was varied. One hundred samples were tested.

TABLE 2

| Thickness of Inner Film ($\mu$m) | Number of Capacitors Which Caused Short-Circuiting Between Terminals | Number of Capacitors Which Caused Leakage of Electrolyte and/or Impregnating Agent |
|---|---|---|
| 25 | 70 | 85 |
| 50 | 3 | 5 |
| 60 | 1 | 2 |
| 70 | 0 | 0 |
| 100 | 0 | 0 |
| 130 | 0 | 0 |
| 150 | 0 | 0 |
| 160 | 0 | 0 |
| 200 | 0 | 0 |
| 300 | 0 | 0 |
| 500 | 0 | 0 |

It is seen from Table 2 above that the thickness of the inner film must be 70 $\mu$m or more in order to prevent any initial defect such as short-circuiting between the terminals or leakage of the electrolyte and/or impregnating agent.

Figure 6:
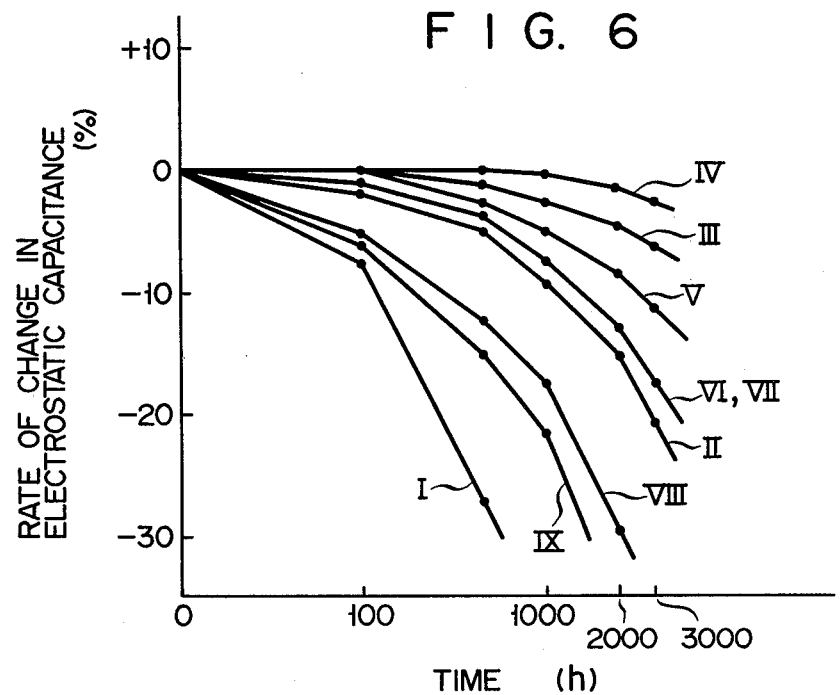
FIG. 6 is a graph showing the life time characteristics (the rate of change in the electrostatic capacitance as a function of time) of the electrolytic capacitor according to another embodiment of the present invention and of the conventional electrolytic capacitor.
Figure 7:
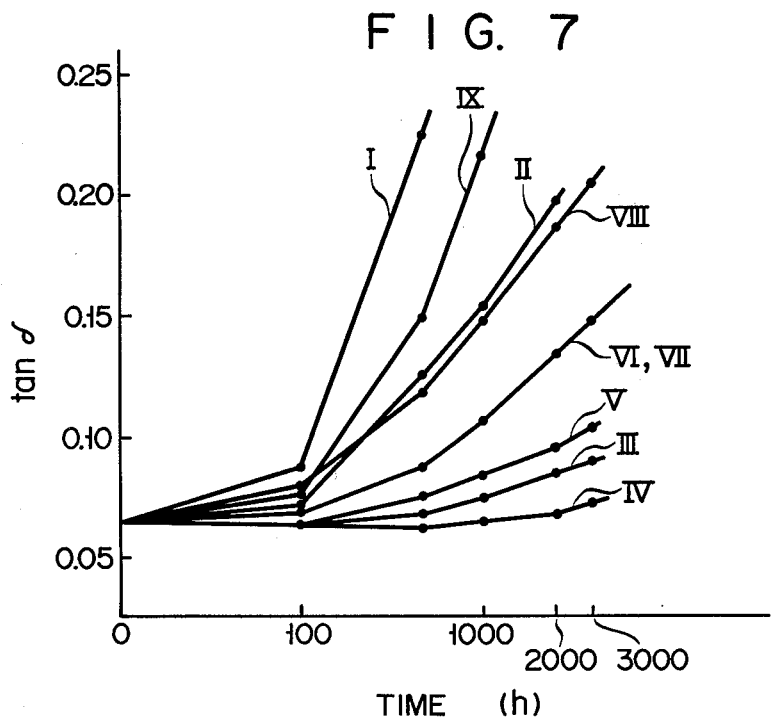
FIG. 7 is a graph showing the life time characteristics (the rate of change in the dissipation factor tan $\delta$ as a function of time) of the electrolytic capacitor according to another embodiment of the present invention and of the conventional electrolytic capacitor.
Figure 8:
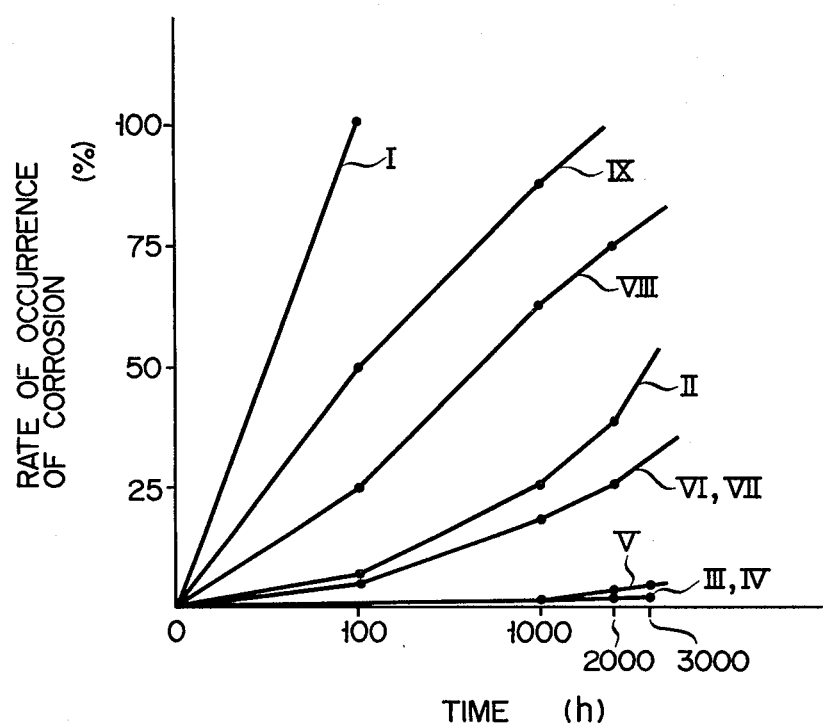
FIG. 8 is a graph showing the rate of occurrence of corrosion as a function of time of the electrolytic capacitor of another embodiment of the present invention and of the conventional electrolytic capacitor.

FIGS. 6 and 7 show the test results on the life time characteristics of the same samples (the rates of change in the electrostatic capacitance and the dissipation factor tan $\delta$, rated voltage was applied in an atmosphere at a temperature of 85° C. and a humidity of 90% RH. FIG. 8 shows the life time characteristics (the rate of occurrence of corrosion) when a rated voltage was applied to the same samples in an atmosphere at a temperature of 85° C. and a humidity of 90% RH after they were cleaned with 1,1,1-trichloroethane vapor. Referring to FIG. 8, characteristic curve I corresponds to the inner film thickness of 25 $\mu$m; characteristic curve II, the thickness of 50 $\mu$m; characteristic curve III, the thickness of 70 $\mu$m; characteristic curve IV, the thickness of 100 $\mu$m; characteristic curve V, the thickness of 150 $\mu$m; characteristic curve VI, the thickness of 160 $\mu$m; characteristic curve VII, the thickness of 200 $\mu$m; characteristic curve VIII, the thickness of 300 $\mu$m; and characteristic curve IX, the thickness of 500 $\mu$m. If the thickness of the inner film is less than 70 $\mu$m, the rate of occurrence of initial defects is high, and the hermetic seal is poor due to separation of the sealed portion. For this reason, the electrostatic capacitance and the dissipation factor tan $\delta$ significantly change. Furthermore, the rate of occurrence of corrosion is also high due to the introduction of the cleaning agent. On the other hand, if the thickness of the inner film exceeds 200 μm, evaporation of the electrolyte is caused through the film section, and leakage is also caused. As a consequence, the electrostatic capacitance and the dissipation factor tan δ also significantly change. Furthermore, due to the introduction of the cleaning agent through the film section, the film swells to cause corrosion within a relatively short period of time and the rate of occurrence of corrosion is also very high. It is seen from Table 2 and FIGS. 6 to 8 that the thickness of the inner film is preferably within the range of 70 to 200 μm.

The present invention has been described with reference to the embodiments of aluminum electrolytic capacitors. However, similar effects may be obtained if the present invention is applied to tantalum electrolytic capacitors, plastic film capacitors, paper capacitors, ceramic capacitors, and so on.

Furthermore, in the embodiments described above, the laminated film was a plastic-metal laminated film consisting of a polyethylene terephthalate film (outer film), an aluminum foil layer (interlayer metal film), and the ionomer film (inner film). However, similar effects were obtained if the outer film of polyethylene terephthalate is replaced by at least one of films of polypropylene, polycarbonate, polysulfone, polyvinylidene fluoride, polyethylene fluoride, polyvinylidene chloride, and polybutylene terephthalate. Similarly, similar effects were obtained if the inner film of ionomer was replaced by at least one of films of polypropylene, polyvinylidene fluoride, and polyethylene fluoride. Similar effects were also obtained if the aluminum foil layer as the metal film was replaced by a metal foil layer of tin or lead. It is also to be noted that similar effects were also obtained if the plastic laminated film consisted solely of plastic films without the metal film was used.

In the electrolytic capacitor of the embodiment shown in FIG. 3 which uses the enclosure structure of a plastic-metal laminated film consisting of plastic films with a metal foil layer interposed therebetween, the metal foil layer is exposed at the cut section of the sealed portion. This may result in short-circuiting between the external connecting terminals or between the capacitor and the surrounding electric elements. In order to prevent such problem, it is possible to perform another partial or entire heat sealing of the sealed portion to form an extruded portion for each plastic film sandwiching the metal foil layer, so that the metal foil layer may not be exposed through the cut section of the sealed portion. When these measures are taken, humidity resistance and weathering resistance are further improved at the cut section of the sealed portion. In addition to this, the step of insulating the exposed part of the metal foil layer by coating an insulating paint on the cut section may be eliminated.

What we claim is:

1. An electric capacitor comprising:
   a capacitor element having a plurality of external connecting terminals; and
   a laminated film which includes at least a plastic film and which covers said capacitor element to form a sealed portion around said capacitor element, said sealed portion being sealed to form an enclosure structure for sealing said capacitor element;
   wherein a sealing width of said sealed portion is 1 to 20 mm.

2. A capacitor according to claim 1, wherein said laminated film comprises a laminated film of at least two films selected from the group consisting of films of polyethylene terephthalate, polypropylene, polycarbonate, polysulfone, ionomer, polyvinylidene fluoride, polyethylene fluoride, polyvinylidene chloride, and polybutylene terephthalate.

3. A capacitor according to claim 1, wherein said laminated film comprises a laminated film of at least two films selected from the group consisting of films of polyethylene terephthalate, polypropylene, polycarbonate, polysulfone, ionomer, polyvinylidene fluoride, polyethylene fluoride, polyvinylidene chloride, and polybutylene terephthalate, a metal film being interposed between said at least two films.

4. A capacitor according to claim 1, wherein a thickness of an inner film of said laminated film opposing said capacitor element is 70 to 200 μm.

5. A capacitor according to claim 1, wherein an inner film of said laminated film opposing said capacitor element comprises a film selected from the group consisting of films of polypropylene, ionomer, polyvinylidene fluoride, and polyethylene fluoride.

* * * * *